(12) United States Patent
Dolinar et al.

(10) Patent No.: US 8,467,968 B1
(45) Date of Patent: Jun. 18, 2013

(54) GLOBAL POSITIONING SYSTEM ROADWAY MARKER

(75) Inventors: Douglas D. Dolinar, Doylestown, PA (US); William R. Haller, Bethlehem, PA (US)

(73) Assignee: LimnTech LLC, Souderton, PA (US)

( * ) Notice: Subject to any disclaimer, the term of this patent is extended or adjusted under 35 U.S.C. 154(b) by 0 days.

(21) Appl. No.: 13/351,829

(22) Filed: Jan. 17, 2012

(51) Int. Cl.
*G01C 21/00* (2006.01)
(52) U.S. Cl.
USPC ........... 701/534; 701/439; 701/446; 701/448; 701/533
(58) Field of Classification Search
USPC ......... 701/468–469, 446, 439, 448, 533–534; 427/136–137; 404/93, 12; 342/357.25, 357.2; 700/283; 382/195
See application file for complete search history.

(56) References Cited

U.S. PATENT DOCUMENTS

| | | | |
|---|---|---|---|
| 4,219,092 A | 8/1980 | Richter | |
| 4,460,127 A | 7/1984 | Hofmann | |
| 4,832,331 A | 5/1989 | Brandli | |
| 5,220,876 A | 6/1993 | Monson et al. | |
| 5,296,256 A | 3/1994 | Hartman | |
| 5,375,059 A * | 12/1994 | Kyrtsos et al. | 701/470 |
| 5,529,433 A | 6/1996 | Huynh et al. | |
| 5,540,516 A | 7/1996 | Nicodemo et al. | |
| 5,549,412 A | 8/1996 | Malone | |
| 5,653,389 A | 8/1997 | Henderson et al. | |
| 5,746,539 A | 5/1998 | Mara | |
| 5,771,169 A | 6/1998 | Wendte | |
| 5,836,398 A | 11/1998 | White | |
| 5,838,277 A | 11/1998 | Loomis et al. | |
| 5,857,066 A | 1/1999 | Wyche et al. | |
| 5,995,902 A * | 11/1999 | Monson | 701/468 |
| 6,074,693 A * | 6/2000 | Manning | 427/137 |
| 6,115,481 A | 9/2000 | Wiens | |
| 6,299,934 B1 * | 10/2001 | Manning | 427/137 |
| 6,330,503 B1 * | 12/2001 | Sharp et al. | 701/50 |
| 6,723,375 B2 | 4/2004 | Zeck et al. | |
| 6,729,706 B1 | 5/2004 | Patton et al. | |
| 6,951,375 B2 | 10/2005 | Patton et al. | |
| 7,029,199 B2 | 4/2006 | Mayfield et al. | |

(Continued)

OTHER PUBLICATIONS

GeoLANMAR: geo assisted landmark routing for scalable, group motion wireless ad hoc networks; Zhou, B.; De Rango, F.; Gerla, M.; Marano, S.; Vehicular Technology Conference, 2005. VTC 2005-Spring. 2005 IEEE 61st ; vol. 4; Digital Object Identifier: 10.1109/VETECS.2005.1543769; Publication Year: 2005 , pp. 2420-2424 vol. 4.*

(Continued)

*Primary Examiner* — Cuong H Nguyen
(74) *Attorney, Agent, or Firm* — Stradley Ronon Stevens & Young, LLP (57) ABSTRACT

An apparatus for placing marks on a resurfaced roadway. The apparatus includes a GPS-based locator for sampling discrete geographical location data of a pre-existing roadway mark evident on the roadway before resurfacing. A computer determines a continuous smooth geographical location function fitted to the sampled geographical location data. And a marker is responsive to the GPS-based locator and geographical location function for replicating automatically the pre-existing roadway mark onto the resurfaced roadway. The apparatus is typically part of a moving vehicle. A related method is disclosed for placing marks on a resurfaced roadway. A similar apparatus can be used to guide a vehicle having a snow plow along a snow covered roadway, or a paving machine along an unpaved roadway surface.

20 Claims, 6 Drawing Sheets

U.S. PATENT DOCUMENTS

| | | | |
|---|---|---|---|
| 7,370,818 B2 * | 5/2008 | Ward et al. | 239/662 |
| 7,552,008 B2 * | 6/2009 | Newstrom et al. | 701/468 |
| 7,640,105 B2 | 12/2009 | Nielsen et al. | |
| 7,832,762 B2 * | 11/2010 | Breed | 280/735 |
| 7,866,917 B2 | 1/2011 | Malit | |
| 7,899,611 B2 * | 3/2011 | Downs et al. | 701/117 |
| 7,981,462 B2 | 7/2011 | Bustgens | |
| 8,190,362 B2 * | 5/2012 | Barker et al. | 701/414 |
| 2004/0124260 A1 * | 7/2004 | Ward et al. | 239/146 |
| 2007/0128899 A1 * | 6/2007 | Mayer | 439/152 |
| 2007/0208497 A1 * | 9/2007 | Downs et al. | 701/117 |
| 2008/0046174 A1 * | 2/2008 | Johnson | 701/209 |
| 2008/0203187 A1 * | 8/2008 | Ward et al. | 239/104 |
| 2010/0104199 A1 * | 4/2010 | Zhang et al. | 382/199 |
| 2010/0185382 A1 * | 7/2010 | Barker et al. | 701/119 |
| 2010/0256912 A1 * | 10/2010 | Nielsen et al. | 702/2 |
| 2010/0257029 A1 * | 10/2010 | Nielsen et al. | 705/11 |
| 2010/0262470 A1 * | 10/2010 | Nielsen et al. | 705/11 |
| 2010/0263591 A1 * | 10/2010 | Nielsen et al. | 118/708 |
| 2012/0054028 A1 * | 3/2012 | Tengler et al. | 705/14.49 |
| 2012/0098657 A1 * | 4/2012 | Bogatine | 340/439 |

OTHER PUBLICATIONS

A comparative study of location aided routing protocols for MANET; Hnatyshin, V.; Ahmed, M.; Cocco, R.; Urbano, D.; Wireless Days (WD), 2011 IFIP; Digital Object Identifier: 10.1109/WD.2011. 6098169 ; Publication Year: 2011 , pp. 1-3.*

Click4BuildingID@NTU: Click for Building Identification with GPS-enabled Camera Cell Phone; Chai Kiat Yeo; Liang-Tien Chia; Tat Jen Cham; Rajon, D.; Multimedia and Expo, 2007 IEEE International Conference on; Digital Object Identifier: 10.1109/ICME.2007. 4284836; Publication Year: 2007 , pp. 1059-1062.*

Implementation of GPS for location tracking; Ariffin, A.A.B.; Aziz, N.H.A.; Othman, K.A.; Control and System Graduate Research Colloquium (ICSGRC), 2011 IEEE; Digital Object Identifier: 10.1109/ICSGRC.2011.5991833; Publication Year: 2011 , pp. 77-81.*

Performance analysis of a shipborne gyrocompass with a multi-antenna GPS system; Lu, G.; Lachapelle, G.; Cannon, M.E.; Vogel, B.; Position Location and Navigation Symposium, 1994., IEEE ; Digital Object Identifier: 10.1109/PLANS.1994.303334 Publication Year: 1994 , pp. 337-343.*

\* cited by examiner

GLOBAL POSITIONING SYSTEM ROADWAY MARKER

TECHNICAL FIELD

The present invention relates generally to devices for making a visual indicia in or on top of pavement and, more particularly, to a GPS-based system used for painting or otherwise "marking" roadway traffic lane demarcation lines.

BACKGROUND OF THE INVENTION

New or repaved roadway surfaces almost always require the application of roadway surface markings as a mechanism for visually providing motorists with lane demarcation lines for controlling and directing traffic. In the past, the process of applying new roadway surface markings consisted of first manually determining the center of the roadway surface and painting small dots to visually define the roadway center. A driver of a paint vehicle would then use the roadway center to guide a paint sprayer which would deposit paint along the path defined by the small dots.

Currently this task is accomplished by determining the center of the roadway at a first location point by manually measuring the width of the roadway and placing a mark at the center point. This process is then repeated to determine the center point of the roadway at a second point which is displaced from the first point. These two points now define the starting and ending points for a line segment which identifies the center path of the roadway. A chain is then stretched between the first and second center points and small white (or other colored) painted dots are manually sprayed and spaced along the stretched chain giving a visual indication of the center line of the roadway. The chain is then removed from the roadway surface. This entire process is then repeated for the next segment of the roadway using the ending position of the first segment as the starting position for the second segment. This process is continuously repeated until the location of the center of the entire roadway has been defined. The roadway center line is used as a reference to define the roadway mark path (i.e., the roadway center line defines the mark path).

Having defined the position of the center of the roadway, a truck equipped with line painting equipment is positioned over the white dots. The driver of the truck then uses the white dots as a visual guide along with a pointer for coarsely positioning the truck over the defined segments. A second operator sits at the rear of the truck and positions a side moveable paint carriage directly over the dots for all defined segments of the roadway center. The side moveable carriage allows the second operator to apply the roadway marking at the desired location and to correct for any slight misalignment of the truck position with respect to the guide dots. A controlled paint spray nozzle array positioned on the side moveable carriage then applies the paint onto the roadway surface as the truck follows each center segment of the roadway. As the truck follows the mark path (the center of the roadway), the nozzle array applies the desired roadway mark (a single or multiple, solid or dashed, roadway marking) which may be offset from the mark path.

Although the current technology achieves the desired goal of providing a system for applying roadway markings, the current system is manually intensive and places the personal safety of workers at significant risk. For example, two workers are required to measure the starting and ending position of the segments, and two workers are required to actually paint the roadway markings (one worker is required to drive the truck and the other worker is required to operate both the carriage and paint dispensing equipment). In addition, to minimize the impact of applying the roadway surface markings to actively traveled roads and highways, the application of roadway markings is usually done in the late evening hours. During this time, traffic visibility is impeded and there is a significant potential for oncoming traffic to collide with those workers manually defining the starting and ending positions for each segment.

Previous attempts to automate the process of marking roadways included guiding the road marking equipment along a predetermined mark path using electromagnetic beams. Unfortunately, these methods required the placement of transmitters along the roadway. Other previous attempts have included the use of light beams arranged in a manner to define the proper path. Again, this attempt proved difficult to implement because of sunlight interference. Other attempts have included using radioactive marking material which would emit a characteristic fingerprint to define the roadway mark path. There are many disadvantages with using radioactive marking material, including health and safety issues, longevity (half-life) of the radioactive material, and disposal problems.

Other attempts to re-mark roadway surfaces have included using a drawing application program in combination with a global positioning system (GPS)-based paint sprayer. A drawing pattern is created using the application program and geographical coordinates for the pattern which are manually defined and then used by the GPS paint sprayer to mark the roadway surface. This attempt requires that the drawing pattern for the roadway be predetermined and fails if the exact location of the roadway marking is inaccurately defined, or if the drawing pattern does not correspond exactly with the geographical position of the actual roadway.

U.S. Pat. Nos. 6,074,693 and 6,299,934 (related as a divisional) each disclose one example of a paint sprayer for marking roadways and fields with a drawing pattern. Both issued to Manning and titled "Global Positioning System Controlled Paint Sprayer," the patents teach a system having an external computer and a GPS paint sprayer. The drawing pattern is created by a designer using either a geographical information system (GIS) which runs, or drawing application programs which run, on the external computer. A print file of the drawing pattern is created by the operating system software and is passed to the GPS paint sprayer. The print file may contain the geographical mapping of pixel data; instead, the geographical mapping of the pixel data may be completed within the GPS paint sprayer. In either case, the geographical mapping of the drawing image is determined and then stored in memory within the GPS paint sprayer. The GPS paint sprayer further includes a GPS receiver and a location comparator. The GPS receiver determines the geographical location of the GPS paint sprayer and the location comparator determines if a match occurs between the current GPS location of the paint sprayer and the geographical mapping of the drawing image. If a location match between the current GPS location of the GPS paint sprayer and geographical mapping data of the drawing image is detected, a control signal is sent to a spray nozzle which deposits paint or other material at the match location. Both lines and picture-like drawings can be marked onto a surface using this patented system.

The '934 patent issued to Manning refers to fifteen earlier patents. Each patent is briefly summarized as follows. First, U.S. Pat. No. 4,219,092, titled "Automatic Guidance Apparatus" and issued to Richter, discloses an apparatus for automatically guiding a moving object such as a vehicle along a predetermined path. The predetermined path is defined by a stripe of material capable of emitting a secondary X-ray wave excited by a first X-ray emitted from the vehicle. Two detectors, a comparison mechanism, and a servo mechanism mounted within the vehicle correct the vehicle's path and maintain the vehicle on the desired path.

U.S. Pat. No. 4,460,127, titled "Device for Applying Uniform Traffic Lines" and issued to Hofmann, discloses a device operable from a moving vehicle for uniformly applying traffic marks by preventing the occurrence of substantial pressure fluctuations during the opening and closing of the paint nozzle. U.S. Pat. No. 4,832,331, titled "Athletic Field Marker" and issued to Brandli, discloses a resilient marker strip which is imbedded into a sports playing field. The top portion of the strip is exposed and visible for marking boundary lines. U.S. Pat. No. 5,220,876, titled "Variable Rate Application System" and issued to Monson et al., teaches a fertilizer blending and dispensing apparatus and method for fertilizing agricultural fields based upon field location and soil type, desired soil fertilizer content, current soil fertilizer status, and vehicle speed. A GPS or other vehicle location mechanism is incorporated into the apparatus.

U.S. Pat. No. 5,296,256, titled "Method and Apparatus for Painting Highway Markings" and issued to Hartman, discloses a method and apparatus for painting traffic marking lines over old paint markings on road pavement. Normally installed on a marking vehicle having a paint gun and a paint supply, the apparatus includes a detector which illuminates the pavement and utilizes a spectroscope to analyze the return inspection for the presence of one or more known preselected constituents of the old paint marking to control actuation of the valve on the paint gun and also track the old pavement marking. The apparatus also provides a paint gun delay function to account for the lead distance between the detector and paint gun and enables the application of new paint markings directly over the old markings at a relatively high rate of vehicle speed.

U.S. Pat. No. 5,529,433, titled "Apparatus and Method for Marking a Surface" and issued to Huynh et al., teaches an apparatus and method for dispensing material to mark a predetermined pattern onto a surface. The dispenser is manipulated in the x, y, and z directions. In addition, the dispenser can rotate and form a tilt angle with a w-axis.

U.S. Pat. No. 5,540,516, titled "Method for Marking Grass Fields and Apparatus for Applying Such Method" and issued to Nicodemo et al., teaches an apparatus and method for marking sports fields by bending grass blades in different directions. The location of the apparatus can be determined by using GPS or transceivers.

U.S. Pat. No. 5,549,412, titled "Position Referencing, Measuring and Paving Method and Apparatus for a Profiler and Paver" and issued to Malone, discloses a road working apparatus for determining the levelness of a road surface (surface profile) as a function of position and a leveler for forming a substantially level mat of material on a base surface of a road.

U.S. Pat. No. 5,653,389, titled "Independent Flow Rate and Droplet Size Control System and Method for Sprayer" and issued to Henderson et al., teaches a flow rate and droplet size control system for spraying a liquid (agricultural fertilizer) onto a surface. A position-responsive control system receives information pertaining to the boundaries of spray zones and spray conditions. The position of the sprayer may be determined by a GPS system.

U.S. Pat. No. 5,746,539, titled "Rapid Road Repair Vehicle" and issued to Mara, discloses a rapid road repair vehicle for quickly repairing a road surface and recording the position and time of the repair. A GPS system is used to determine the location of the repair.

U.S. Pat. No. 5,771,169, titled "Site-Specific Harvest Statistics Analyzer" and issued to Wendt, discloses both an apparatus and method for allowing a farmer to analyze site-specific data for optimizing crop yield as a function of any number of inputs. Geo-referenced maps along with data representative of a spatially variable characteristic are used to analyze statistical data for at least one given region of a farming field. A GPS-based location system may be used to define regions of interest for the analysis.

U.S. Pat. No. 5,836,398, titled "Vehicle Mounted Fire Fighting System" and issued to White, discloses a vehicle for fighting fires which may have a GPS/GIS system to determine the location of the vehicle relative to the proximity of a fire and other surroundings.

U.S. Pat. No. 5,838,277, titled "GPS-Based Controller Module" and issued to Van Wyck Loomis, discloses a zone-based GPS controller module. The apparatus includes a GPS receiver, a zoned map, and controller logic. The GPS location is used to determine a particular zone location. In response to a particular zone location, the controller produces analog or logic signal outputs.

U.S. Pat. No. 5,857,066, titled "Method and System for Producing an Improved Hiking Trail Map" and issued to Wyche et al., discloses a method for producing a hiking trail map using a GPS receiver for determining the positions at the beginning and end of each approximately linear trail segment.

U.S. Pat. No. 6,115,481, titled "User Modifiable Land Management Zones for the Variable Application of Substances Thereto" and issued to Wiens, discloses an apparatus and method for applying one or more formulations of substances (such as fertilizers, pesticides, and the like) to farmland, forest, and other areas based upon the specific geographical location (i.e., a particular zone within the land area). A GPS system may be used for graphically tracking a representation of a vehicle traversing the land area for determining the particular zone and formulations for that zone.

At the time of current research, seven patents reference the Manning patents. Each is briefly identified as follows. First, U.S. Pat. No. 6,723,375, titled "Portable Locator Including a Ground Marking Arrangement" and issued to Zeck et al., discloses a method for locating an underground cable and marking the surface above the buried cable.

U.S. Pat. No. 6,729,706, titled "Large Area Marking Device and Method for Printing" and issued to Patton et al., discloses an apparatus and method for printing an image over a large surface area such as driveways, fields, and decks or patios. U.S. Pat. No. 6,951,375, titled "Large Area Marking Device and Method for Printing" and issued to Patton et al., discloses a method and apparatus for printing an enhanced image on a large surface area using a scanned approximation (crude image) of the desired image. These two patents specifically refer to the '693 patent and characterize GPS systems as lacking the accuracy for printing an image.

U.S. Pat. No. 7,029,199, titled "Automatic Ground Marking Method and Apparatus" and issued to Mayfield et al., discloses an apparatus for marking an even or uneven surface with complex patterns or logos. A GPS-based guidance system may be used for determining the location of the marker apparatus.

U.S. Pat. No. 7,640,105, titled "Marking System and Method with Location and/or Time Tracking" and issued to Nielsen et al., discloses an apparatus and method for marking ground or pavement to provide a visual indication of a buried utility. A GPS-based system is used to record the geographical location of marks placed on the surface. The time that the mark was made may also be recorded.

U.S. Pat. No. 7,866,917, titled "Trailing System for Dispensing Paint" and issued to Malit, teaches a device and method for marking roadways. The device has a mechanism for uniquely identifying the road which may include selectively visible paint. The paint (or other marks) are used to compliment a computer-assisted transportation system and other applications.

U.S. Pat. No. 7,981,462, titled "Method for Applying Paints and Varnishes" and issued to Bustgens, teaches a method for applying paint to buildings and other objects while avoiding protrusions, balconies, and the like which may be incorporated into the desired surface, according to an image template.

The current roadway marking technology has several problems. One problem is that a significant amount of manual labor is required to accurately paint lines on roadways, and as a result workers are placed in an unsafe working environment during the roadway marking process. Another problem with current technology is the inability to easily and quickly obtain sampled geographical coordinates of the existing roadway line marks using GPS or GPS-based pseudolite arrays. A related problem is the inability to use this sampled data to generate a continuous function of the geographical coordinates for the entire mark path. Additional problems are the lack of an offsetting capability to determine other substantially parallel mark paths for line marking and, therefore, the inability to uniformly deposit paint or other material along the first (or second) mark path duplicating the previous mark.

The '693 patent expressly notes certain disadvantages with the current roadway marking technology. Under the heading "Description of the Prior Art," as column 1, lines 11-40, the '693 patent states: "Road markings are produced to a great extent with the assistance of so called 'road marking' machines which apply paint under pressure from spray nozzle jets onto the road surface. In marking the road it is quite important that the horizontal registration of the paint be accurate with respect to the position of the road. In the past even experienced machine operators have found it difficult to manually guide a road marking machine with sufficient accuracy even where old markings are available. Heretofore, attempts have been made to automatically detect the presence of old markings and to use their detection for automatically guiding the road marking machine and switching the spray nozzle on and off as required. However, such attempts have not been wholly satisfactory because a break in the old marking does not give steering guidance during breaks. Moreover, this approach is of no use whatsoever where the old marks have disappeared or for new markings. Various arrangements have been disclosed for solving these problems by automatically guiding the road marking machine along a pre-determined path using light or electromagnetic beams. However, these arrangements require transmitters to be placed along the road, and in the case of light beams, are degraded by the effect of sunlight. In order to overcome these problems, it has been proposed to embed material [that] emitting radiation in the path that is to be marked. However, this method suffers from the disadvantage that embedding the radiating material in the road surface can be costly. Furthermore, radiating materials tend to lose their effectiveness after a time period. Similar issues pertain to parking lots, air landing fields, and the like."

Although Manning identifies certain disadvantages with the known roadway marking technology, the GPS-controlled paint spray system disclosed by Manning in the '693 and '934 patents has its own disadvantages. First, a designer must generate a drawing and it must be assumed that the designer has accurately generated the drawing pattern. It must be further assumed that the actual constructed road matches the content of the drawing pattern. And the system fails if a discrepancy exists between the actual and drawing pattern road position.

In addition, the disclosed system cannot maintain the accurate horizontal registration of the paint markings which is required when the drawing pattern does not accurately match the actual constructed roadway. This situation occurs where on-site construction changes are prompted by unforeseen construction problems. Such problems include, for example, bedrock formations, unstable ground structure, water runoff, and the like.

The designer using the system disclosed by Manning must determine and enter data corresponding to the reference geographical location for the center of the drawing, scaling information, orientation information, and other aspect ratio information to accurately determine the marking size and orientation. Thus, the system may require registration, orientation, and size input. The designer also must enter data manually for road markings, such as end points for a line, or an equation using known geographical location coordinates. This includes known coordinates from a previous survey. The system assumes that the designer can accurately determine geographical mark locations.

For an arc, the designer must select the end points and a radius. Such selection does not allow for a smoothly constructed functional fit. The designer must manually join line segments used to make a relatively long continuous painted line. The track line, which is a line, is produced from individual points and is not a smoothly derived curve from a mathematically derived function.

The system disclosed by Manning relies on an available equation. It does not sample pre-existing roadway marks (or produce a set of spaced points). The system does not record cross track position relative to a GPS receiver. The '693 patent does not disclose any mechanism for producing a curved line. Finally, the system disclosed by Manning paints only when there is a location match between the current GPS-based location and one of the data points in the geographical mark location data.

Thus, there is a need in the industry for a roadway surface marking system that requires less manual labor, increases the operational safety factor for workers, and is less expensive than the current roadway marking technology, and which will accurately and uniformly mark roadway repaved surfaces.

To overcome the shortcomings of current roadway marking technology, a new apparatus and method for placing marks on a resurfaced (or repaved) roadway are provided. A basic object of the present invention is to provide an improved apparatus for automatically marking repaved roadways. A related object is to sample the geographical position of a pre-existing roadway mark path. A further related object is to sample the geographical position of a pre-existing roadway mark path using a GPS or GPS-based pseudolite array system.

It is another object of the invention to determine a continuous mark path based upon the sampled geographical mark path. It is still another object of the present invention to quickly determine the pre-existing roadway mark characteristics, pattern, and geographical position. An additional object is to accurately deposit paint or other marking material onto a repaved roadway replicating the pre-existing mark at locations determined by the continuous mark path.

Yet another object of the invention is to automatically create a second continuous roadway mark path substantially parallel to the original mark path. It is a further object of the invention to accurately deposit paint or other marking material onto a repaved roadway at the location determined by the second continuous roadway mark path. It is yet another object of the invention to provide a system for guiding the driver of the roadway marking vehicle. A related object is to dispense an even and consistent paint mark irrespective of vehicle speed. The invention has as another object automatically guiding the paint vehicle along the mark path based upon a mark path continuous function.

BRIEF SUMMARY OF THE INVENTION

To achieve these and other objects, to meet the needs identified above and others which will be apparent from a review of the current technology, and in view of its purposes, the present invention provides an apparatus for placing marks on a resurfaced roadway. The apparatus includes a GPS-based locator for sampling discrete geographical location data of a pre-existing roadway mark evident on the roadway before resurfacing. A computer determines a continuous smooth geographical location function fitted to the sampled geographical location data. And a marker is responsive to the GPS-based locator and geographical location function for replicating automatically the pre-existing roadway mark onto the resurfaced roadway. The apparatus is typically part of a moving vehicle. A related method is disclosed for placing marks on a resurfaced roadway. A similar apparatus can be used to guide a vehicle having a snow plow, paver, or other similar equipment along a roadway.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
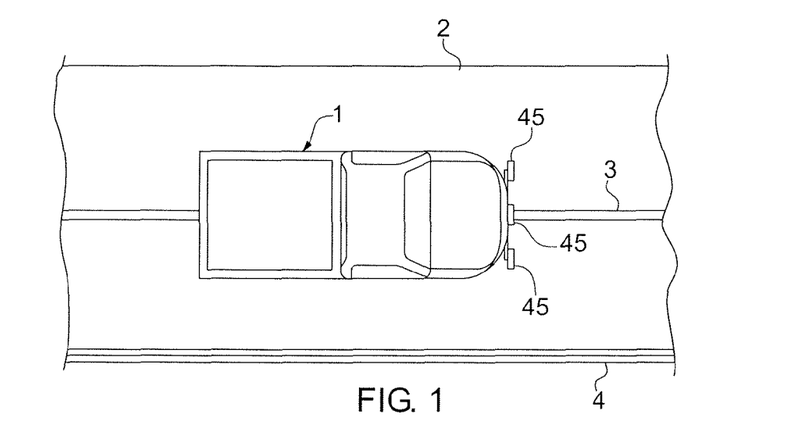
FIG. 1 is a diagrammatic plan view of a vehicle fitted with the apparatus according to the present invention and moving along a road.

Referring now to the drawing, in which like reference numbers refer to like elements throughout the various figures that comprise the drawing, FIG. 1 shows a self-propelled vehicle 1 which is located on a road 2 near a line 3 applied to the surface of the road 2. Also shown is a roadway edge boundary line 4. The term "vehicle" is given its broadest meaning, including any conveyance, motorized device, or moving piece of mechanical equipment for transporting passengers or apparatus. More specific and preferred examples of vehicles are trucks, snow plows, and road marking machines.

Figure 2:
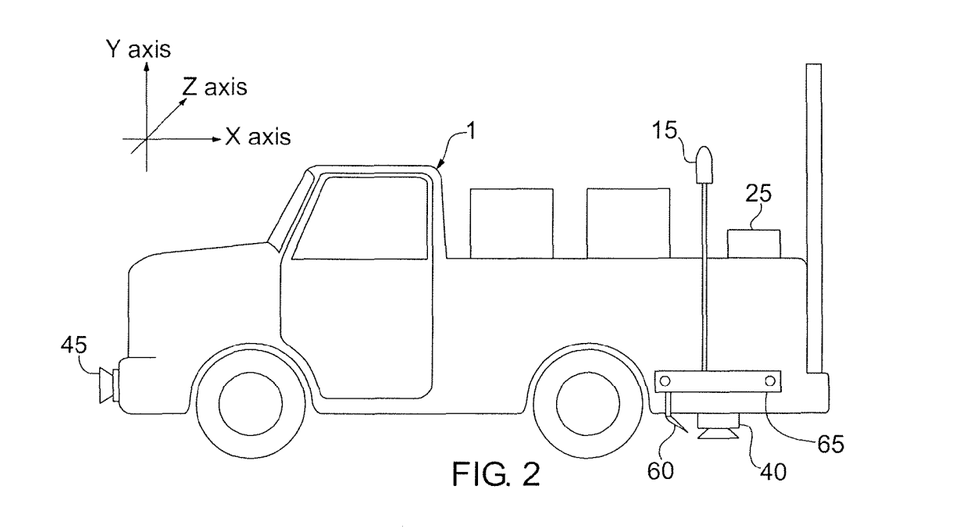
FIG. 2 is a diagrammatic side view of a vehicle fitted with the apparatus according to the present invention, illustrating additional components of the apparatus.

As illustrated in FIG. 2, the vehicle 1 is fitted with a number of components. Specifically illustrated in FIG. 2 are a GPS antenna 15, a computer 25, a first imager 40, a second imager 45, a nozzle array and control system 60, and a moveable cross track carriage 65. FIG. 1 shows that the vehicle 1 may be fitted with any number of second imagers 45 (three are shown).

Figure 3:
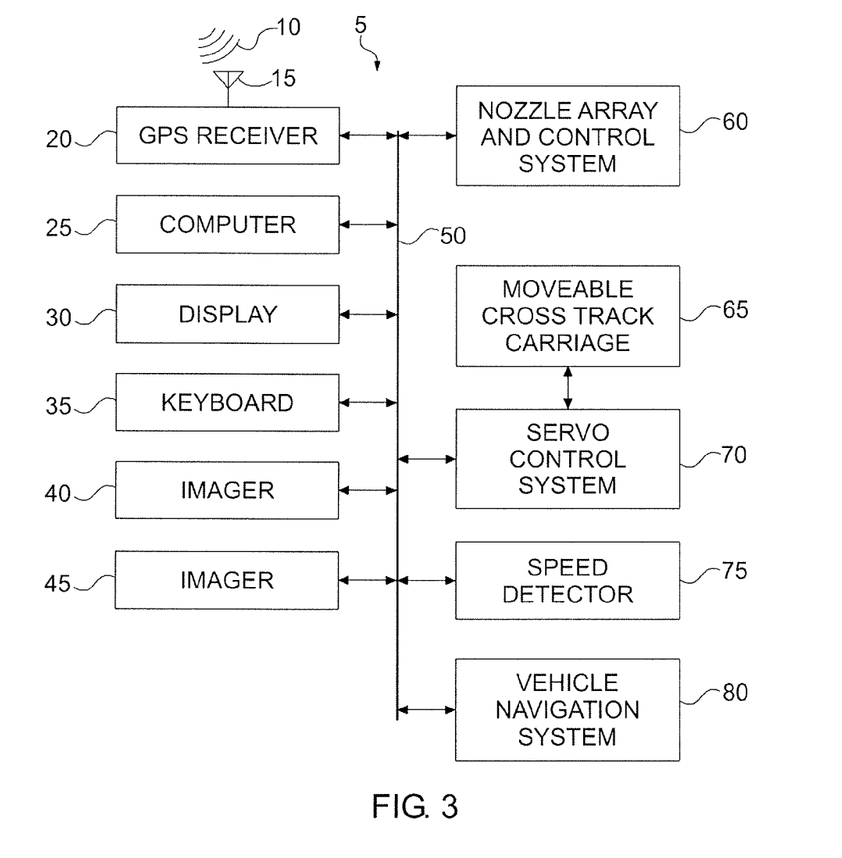
FIG. 3 is a schematic block diagram illustrating components of a preferred embodiment of the apparatus according to the present invention.

FIG. 3 is a schematic block diagram 5 illustrating components of a preferred embodiment of the apparatus according to the present invention. The preferred embodiment comprises a number of components and systems which include the GPS antenna 15, a GPS receiver 20, the computer 25, a visual display 30, a keyboard 35, the first imager 40, the second imager 45, the nozzle array and control system 60, the moveable cross track carriage 65, a servo control system 70, a speed detector 75, and a vehicle navigation and control system 80. All of the systems with the exception of the moveable cross track carriage 65 are electrically interconnected, and in communication with each other, via a bus 50.

The GPS antenna 15 receives GPS radio wave signals 10 which originate from a GPS satellite system or a GPS-pseudolite array (not shown). "Pseudolite" is a contraction of the term "pseudo-satellite," used to refer to something that is not a satellite which performs a function commonly in the domain of satellites. Pseudolites are typically small transceivers that are used to create a local, ground-based GPS alternative. The range of each transceiver's signal depends on the power available to the unit. Being able to deploy one's own positioning system, independent of the GPS, can be useful in situations where the normal GPS signals are either blocked or jammed (e.g., in deference to military conflicts), or simply not available.

The GPS antenna 15 is connected to the input of the GPS receiver 20, which decodes the GPS signals 10 for determining its geographical location. The receiver 20 is further electrically connected to the bus 50, and is in bi-directional communication with the other systems connected to the bus 50. The GPS geographic position of the antenna 15 is adjusted to account for any physical separation of the nozzle array and control system 60 from the antenna 15, so that the actual geographical position of the nozzle array and control system 60 is determined by the decoded GPS signals 10.

Figure 4:
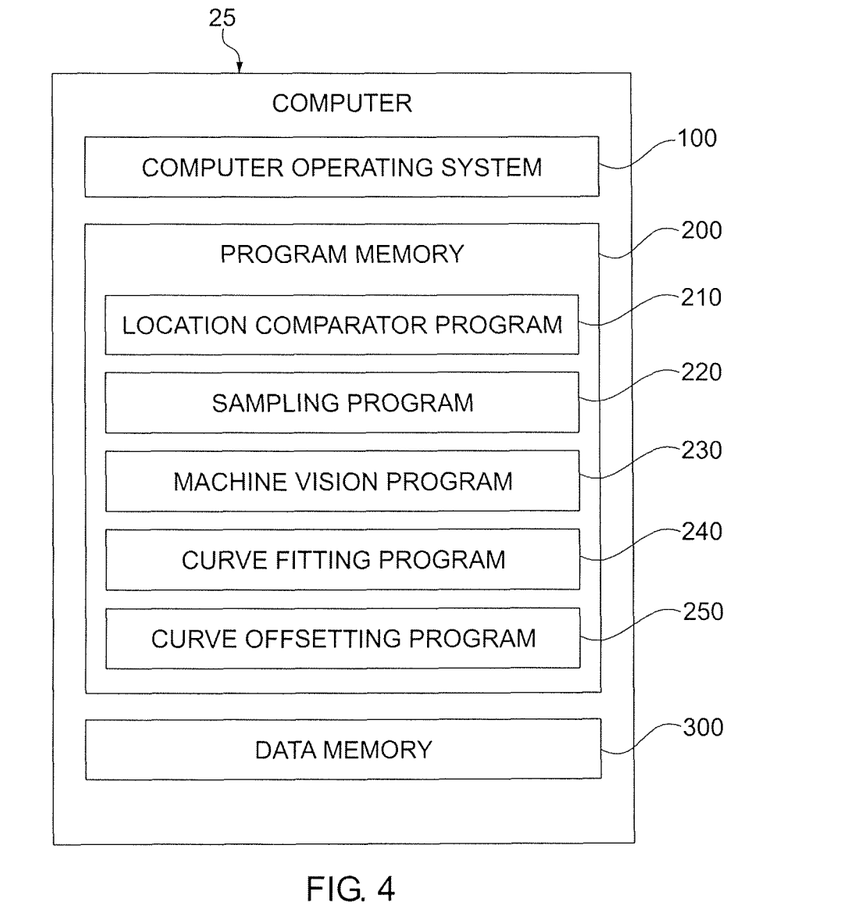
FIG. 4 is a schematic block diagram illustrating components of a computer of the preferred embodiment of the apparatus shown in FIG. 3.

The computer 25 is a conventional computer having data and program memory as shown in FIG. 4. Operating system (OS) software 100 is a conventional operating system such as Windows 7 manufactured by Microsoft, a Unix-based OS, or an Apple Computer OS X Lion operating system. The computer 25 also has program memory 200 and data memory 300, in addition to the memory required by the operating system 100. The computer 25 further has a real-time time base for calculating accurate time intervals (not shown).

The program memory 200 comprises a location comparator program 210, a sampling program 220, a machine vision program 230, a curve fitting program 240, and a curve offsetting program 250. The location comparator program 210 compares the current GPS location received by the antenna 15 and decoded by the GPS receiver 20 to previous GPS locations stored in data memory 300 (along with the characteristics of the pre-existing roadway mark, including type, geometry, and dimensions). The location comparator program 210 then determines the difference between the current and the stored GPS locations.

The sampling program 220 receives a GPS reference location and constructs an orthogonal Cartesian (or other conventional) coordinate system (grid system) having the origin defined at the reference location and further, based upon the constructed grid system and the distance sampling interval, samples the geographical location of the pre-existing roadway mark. The machine vision program 230 inputs data from the imagers 40 and 45 and performs edge detection, geometric computations, and other generic machine vision operations on the image data from the imagers 40 and 45.

The curve fitting program 240 inputs discrete GPS coordinate data stored in the data memory 300 and determines a first continuous mathematical function which fits the discrete GPS coordinate data. The curve offsetting program 250 inputs the continuous function determined by the curve fitting program 240 and generates a second continuous function similar and parallel to the first function but offset from the first function by a given distance. For example, the first function may represent the center mark line 3 on the road 2. A second function defining a roadway edge mark line 4 may be derived from the first function by offsetting the first function by a distance, or the first function may represent a roadway edge mark line 4 and the center mark line 3 may be derived from the first function by offsetting the first function by a distance.

Thus, the present invention can further be embodied in the form of computer-implemented processes and apparatus for practicing such processes, for example, and can be embodied in the form of computer program code embodied in tangible media, such as floppy diskettes, fixed (hard) drives, CD ROM's, magnetic tape, fixed/integrated circuit devices, or any other computer-readable storage medium, such that when the computer program code is loaded into and executed by the computer 25, the computer 25 becomes an apparatus for practicing the invention. The program also may be embodied in a carrier where the carrier may be a tangible media or a transmitted carrier wave.

Figure 5:
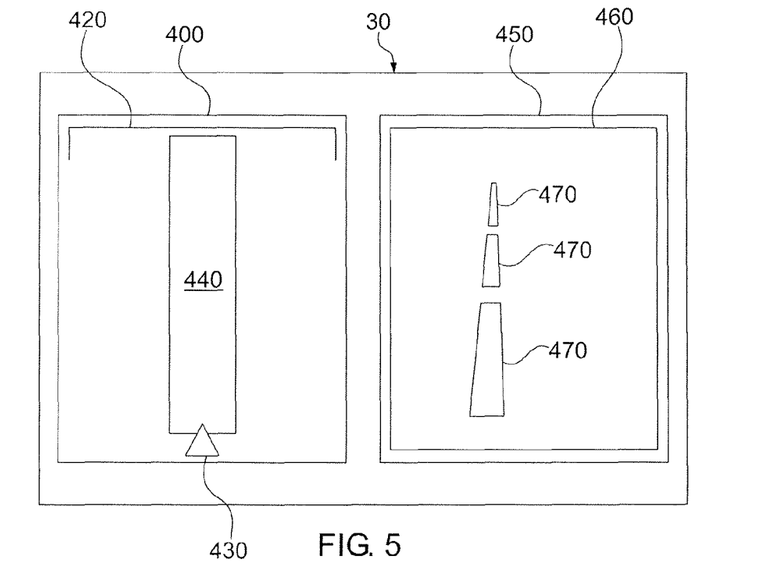
FIG. 5 is a schematic block diagram illustrating components of a display of the preferred embodiment of the apparatus shown in FIG. 3.

The display 30 is a conventional computer display adapted to present information to an operator. The display 30 is capable of displaying one or more windows such as an operator may view using a windows-based operating system. Preferably the display 30 contains a left window 400 and a right window 450 as shown in FIG. 5. The left window 400 displays the image from the first imager 40. Displayed within the left window 400 are a cross travel bar 420; a yellow, rectangle-shaped roadway mark 440 imaged by the first imager 40 located proximate the rear of the vehicle 1; and the position of the nozzle array and control system 60 represented by the red arrow 430. The right window 450 of the display 30 depicts the image from the second imager 45 which images the roadway mark path 470 in front of the vehicle 1. Also displayed within the right window 450 is a red alignment box 460.

The keyboard 35 permits the operator to manually enter data similar to a conventional computer keyboard. The keyboard 35 is connected to the bus 50. Alternatively, the keyboard 35 may be directly connected to the computer 25.

The first imager 40 is fixedly attached to the vehicle 1. As illustrated in FIG. 2, the first imager 40 is downwardly focused onto the surface of the road 2 such that its field of view includes the entire roadway surface under the moveable cross track carriage 65. The second imager 45 is also fixedly attached to the vehicle 1 and, as illustrated in FIGS. 1 and 2, focused to image the roadway surface in front of the vehicle 1 so that a clear image of the roadway mark is visible.

The nozzle array and control system 60 is mounted onto the moveable cross track carriage 65. One or more nozzle jets may be incorporated into the nozzle array and control system 60 for spraying (or otherwise placing or delivering) one of more lines of paint (or any other suitable marking material). The paint may be the same or a different color. Other material may be sprayed onto the surface of the road 2 with the paint, such as glass beads instead of just the paint. In addition, the nozzle array and control system 60 is responsive to the speed of the vehicle 1, as determined by the speed detector 75, and adjusts the dispensing rate of the paint dependent upon the speed of the vehicle 1 to maintain the same paint thickness irrespective of the speed of the vehicle 1. The nozzle array and control system 60 compensates for positional offsets of the individual jets, such that the GPS coordinates for the individual jets are determined.

The moveable cross track carriage 65 is usually (although not necessarily) mounted on the driver's side of the vehicle 1 as shown in FIG. 2. The moveable cross track carriage 65 moveably extends outwardly from the side of the vehicle 1 to position the nozzle array over the roadway mark line. Hydraulic or electrical actuators mounted on the vehicle 1 are used to position the moveable cross track carriage 65 over the roadway mark line.

The servo control system 70 is responsive to control signals placed onto the bus 50 and is responsive to the machine vision program 230. The servo control system 70 controls the hydraulic or electrical actuators. Thus, the servo control system 70 controllably moves the moveable cross track carriage 65 to a desired cross track position.

The speed detector 75 determines the speed of the vehicle 1. The vehicle speed may be determined by conventional mechanisms such as an electronic speedometer.

The vehicle navigation system 80 is a conventional automated system for controlling the direction, speed, and acceleration of the vehicle 1 along a predetermined path. By "predetermined" is meant determined beforehand, so that the predetermined characteristic must be determined, i.e., chosen or at least known, in advance of some event. The navigation system 80 includes both the hardware and software necessary to completely control the movement of the vehicle 1 along a path without human intervention. The apparatus described above forms a GPS-based system used for painting, or otherwise "marking," roadway traffic lane demarcation lines.

In operation, the apparatus according to the present invention can be used as follows. The operator of the vehicle 1 first positions the vehicle 1 at the start of the desired roadway mark and in a direction of travel for recording the mark path. The first imager 40 images the surface of the road 2 under the complete moveable cross track carriage 65 travel distance and the operator positions the vehicle 1 so that an image of the roadway mark appears in the left window 400 of the display 30. The machine vision program 230 recognizes the roadway mark and determines the amount of cross travel necessary to align the cross travel carriage 65 to the mark center. A control signal is then sent to the servo control system 70 from the machine vision program 230 to move and align the moveable cross track carriage 65 having the attached nozzle array and control system 60 to the center of the mark. Alignment is displayed as a red arrow 430 centered on the imaged roadway mark 440. The imaged mark along with the aligned red arrow relative to the cross travel bar 420 is shown in FIG. 5. The cross travel bar 420 gives the operator a visual indication of the maximum cross travel distance of the moveable cross track carriage 65.

The operator then enters the positional sampling interval by using the keyboard 35, which is then sent by the computer 25 to the sampling program 220. The operator then depresses a "Start-to-Record" key on the keyboard 35 which begins the process of recording the geographical location and characteristics of the mark. The reference location is determined as the geographical position of the aligned moveable cross track carriage 65 (corrected for any positional offsets of the antenna 15) when the Start-to-Record key is depressed. The roadway mark may be a solid or dashed, single or double line, or combination thereof. For example, a roadway mark may consist of a solid line and a parallel dashed line in close proximity to the solid line, such as a conventional roadway mark to indicate that passing in one direction is allowed but passing in the opposite direction is not allowed.

Once the Start-to-Record key is depressed, the computer 25 begins to input the vehicle speed data from the speed detector 75. The operator then begins to move the vehicle in the direction of the roadway mark path 470 and uses the right window 450 of the display 30 to assist in maintaining the vehicle path coincident with the roadway mark path 470. The operator steers the vehicle 1 so that the roadway mark path 470 is maintained within the red alignment box 460. Maintaining the vehicle 1 within the red alignment box 460 insures that the servo control system 70 along with the machine vision program 230 will be able to position the moveable cross track carriage 65 within the cross travel limitations indicated by the cross travel bar 420 of the moveable cross track carriage 65 along the roadway mark path 470.

Geographical position data of the mark are sequentially sampled and stored in the data memory 300 of the computer 25 using the sampling program 220 and the Cartesian coordinate system (see the orthogonal x, y, and z axes shown in FIG. 2). The geographical positional sampling occurs at a distance interval previously defined by the operator along one of the Cartesian coordinate system axis. Sampling of the geographical position for the roadway mark path 470 occurs when the vehicle 1 has traveled the sampling interval which is calculated by the sampling program 220 using the decoded GPS positional data from the GPS receiver 20 and the Cartesian coordinate system. Alternately, the sampling distance can be calculated using the speed detector 75 and the time base of the computer 25.

As the vehicle 1 passes over the mark, the computer 25 determines the length, width, color, and the number of lines (single, double) of the mark by using the machine vision program 230 and the speed of the vehicle 1 derived from the speed detector 75 and the time base of the computer 25. The characteristics of the mark are also stored within the data memory 300. If the mark characteristics change from one form to another as the vehicle 1 transverses the roadway mark path 470, the machine vision program 230 recognizes the change in the mark characteristics and stores the geographical location of the change, along with the new mark characteristics. For example, dashed marks may change to a solid line mark, and a double solid line mark may change to a single dashed line mark. The geographical position of the change in mark characteristics is recorded along with the sampled mark path.

At the end of the roadway mark path 470, the operator depresses a "Stop-Record" key on the keyboard 35, which terminates the process of sampling and storing the geographical location and mark characteristics. In addition, upon depression of the Stop-Record key, the curve fitting program 240 determines a continuous mark path function using a curve fitting algorithm over the mark path interval using the Cartesian coordinate system determined by the sampling program 220. The original mark path is now defined as a continuous function referenced to the start location and to the grid pattern of the Cartesian coordinate system.

The roadway is now ready to be repaved. The process of repaving completely covers all remnants of the old roadway mark. Alternatively, the old roadway mark is removed by physical mechanisms such as by wire brushing, grinding, by water jetting or blasting, or by some other conventional mechanism.

To re-establish or replicate the roadway mark at the same location, the location comparator program 210 compares the current GPS location of the moveable cross track carriage 65 (along with the nozzle array and control system 60 with positional offset correction) with the reference location previously stored in the data memory 300. The location comparator program 210 then further displays positional instructions to the operator of the vehicle 1 in the left window 400 of the display 30 for assisting the operator in positioning the red arrow of the moveable cross track carriage 65 in close proximity to the reference position.

Once the vehicle 1 has been approximately positioned at the reference point, the machine vision program 230 displays the original mark previously stored in the data memory 300 into the left window 400 of the display 30 and commands the servo control system 70 to move the cross travel carriage 65 into alignment with the reference position. In addition, the right window 450 of the display 30 now displays the original mark path for the operator to follow along with the red alignment box 460 to assist the operator in maintaining alignment of the cross track carriage 65 to the desired position given by the previously determined mark path continuous function.

After the cross track carriage 65 has been aligned with the reference position, the operator depresses the "Start-to-Repaint" key on the keyboard 35 and begins to move the vehicle 1 along the roadway mark path 470 displayed (along with the actual mark) in the right window 450 of the display 30. The displayed roadway mark path 470 is now derived from the mark path continuous function.

Figure 6:
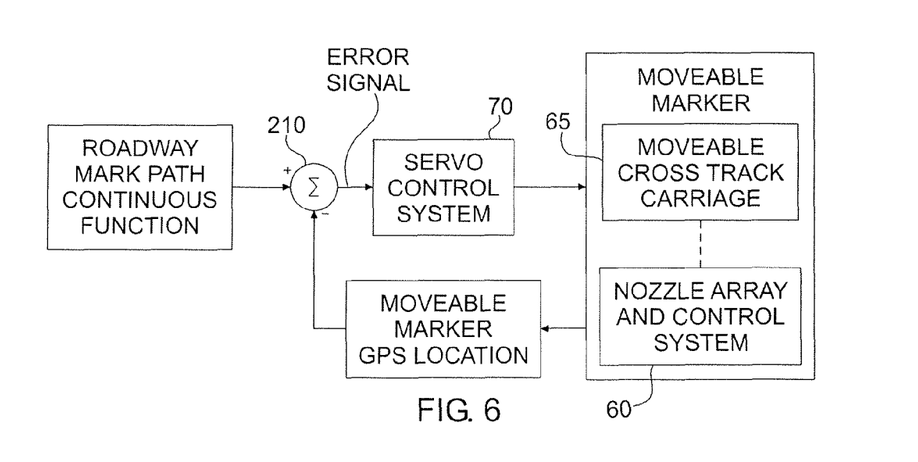
FIG. 6 illustrates the feedback system for controlling the movement of the moveable carriage.
Figure 7A:
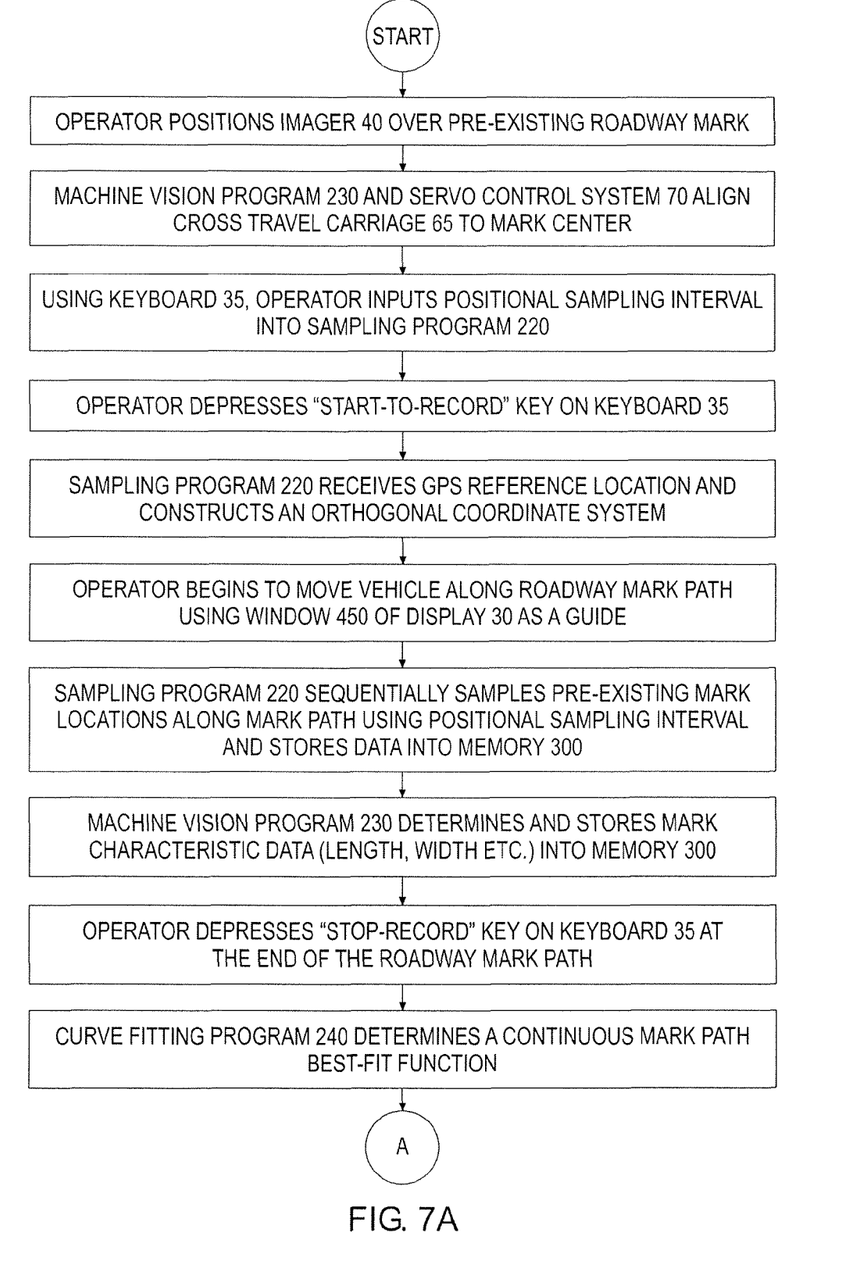
FIGS. 7a and 7b illustrate the operational flowchart of the apparatus.
Figure 7B:
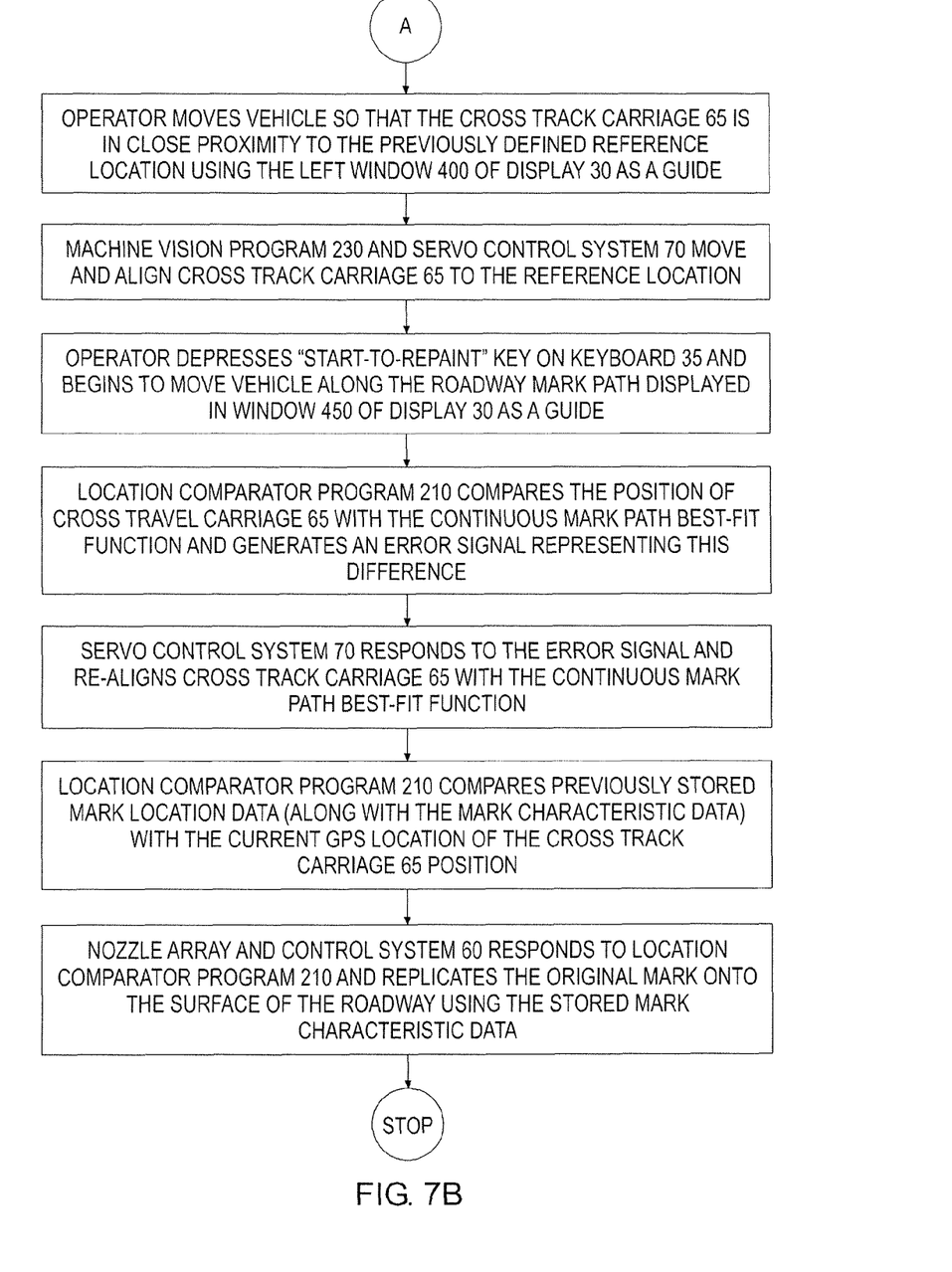

As the vehicle 1 moves, the location comparator program 210 compares the position of the cross track carriage 65 with the roadway mark path 470 defined by the continuous function and generates an error signal representing the difference between the actual cross track carriage 65 geographical position and the continuous function mark path geographical position. This error signal is used by the servo control system 70 to move the cross track carriage 65 back onto the roadway mark path 470 defined by the continuous function. This feedback system is further illustrated in FIG. 6. As the vehicle 1 moves along the roadway mark path 470 defined by the continuous function, the previously stored mark location and characteristic data are compared to the current (position corrected) GPS location of the cross track carriage 65 and the respective mark is replicated onto the surface of the road 2 by the nozzle array and control system 60. An operational flow chart summarizing the major processes of the invention is illustrated in FIGS. 7a and 7b.

Depending upon the speed of the vehicle 1, the nozzle array and control system 60 dispenses the appropriate volume of paint responsive to the speed of the vehicle 1 derived from the speed detector 75 to maintain the desired paint thickness. For example, a slow moving vehicle 1 would dispense paint at a slower rate than that for a fast moving vehicle which would require dispensing paint at a faster rate to maintain consistency of paint thickness.

The apparatus and method described above in accordance with a preferred embodiment of the invention give the operator the ability to sample an existing roadway mark using GPS or pseudolite technology. Sampling of the roadway mark requires discrete geographical points which may be accomplished, depending upon the acquisition speed of the geographical positioning system, at a sampling vehicle speed which will minimally impact the flow of regular traffic.

The apparatus and method use conventional curve fitting techniques to produce a continuous function representing the mark path from the sampled data points and yield a consistently smooth curve. Such curve fitting techniques are unlike the joining of linear line segments which have a tendency to have a jagged, or "put-together," appearance. The curve fitting of only one roadway mark (e.g., the centerline of a mark) is required and any additional roadway marks (e.g., the roadway edge boundary line 4) may be obtained by offsetting the continuous function derived from a first continuous mark path by an amount consistent with the desired relative position of the second mark path. For example, to define a side roadway mark using a centered defined functional mark path requires only a simple mathematical operation of offsetting the original functional mark path by a desired distance (typically the width of the traffic lane). This technique guarantees exact parallel placement of the side mark with respect to the center mark.

In addition, the actual sampling of a pre-existing roadway mark ensures that, after repavement of the roadway is completed, the new repainted mark will be placed in exactly the same position on the roadway as the previous mark. For known systems that convert a drawing pattern into geographical coordinates for painting a surface, a problem arises in the field where the actual drawn pattern is not compatible with the actual field requirements. For example, sometimes the roadway must be changed as the result of a rock formation or other obstructions. Further, roadway positions are frequently changed to accommodate commercial or residential development in a particular area. A predetermined drawing pattern unfortunately does not reflect the reality of changes in the road position as the result of field-induced changes. Thus, any system using a drawing pattern may not reflect the actual road position and, therefore, may not accurately mark the roadway. The apparatus and method according to a preferred embodiment of the invention avoid these problems.

Another improvement over the known systems is that the original roadway mark is characterized according to type (color, dashed, continuous, or other) and geometrical dimensions (length, width, and the like). This is an important consideration for maintaining the exact mark sequence for a mark path. For example, a portion of the mark path may have a dashed yellow mark and another portion of the mark path may have a continuous white mark. This information is used to selectively choose the correct color and also to control the spray width and dispensing cycle so that the original mark may be exactly reproduced.

The apparatus and method for placing (printing) marks on a resurfaced roadway, according to a preferred embodiment of the invention, achieve numerous additional advantages over the known technology. Among those advantages are the following:

1. Geographically sampling the coordinates of pre-existing roadway marks using GPS technology;
2. Computing a continuous function to determine the mark path from the mark samples;
3. Automatically duplicating and re-painting the roadway mark patterns depending upon the previous mark pattern;
4. Accurately depositing roadway mark patterns such as continuous or dashed lines independent of the speed of the vehicle 1;
5. Providing for automatic and semi-automatic vehicle alignment and/or movement on the mark path;
6. Automatically determining pre-existing mark geometric characteristics;
7. Coordinating the material spray dispensing rate in response to vehicle speed;
8. Protecting workers completely from vehicular traffic and weather;
9. Reducing work force requirements because only one operator is required both to determine the geographical coordinates of existing roadway marks and to re-paint the marks;
10. Converting the mark samples and geometric characteristics into a pattern;
11. Automatically adding a positional offset to re-paint other roadway marks which can be mathematically offset from the sampled mark path; and
12. Providing for a smooth and continuous mark path.

The apparatus and method for placing marks on a resurfaced roadway, according to a preferred embodiment of the invention, use a GPS-based location system to sample the geographical position of an existing roadway mark. Although many of the known patents use GPS for positional information to determine the location of vehicles, the apparatus and method of the present invention singularly use GPS to determine the geographical position of an existing roadway mark. The advantages of determining the roadway mark before repaving or re-painting include: (1) determining the exact location of the mark; and (2) from this information, using a mathematical model to form a continuous geometrical function of the mark path. The GPS-based location system includes any GPS pseudolite or GPS-like, self-calibrating, pseudolite array system and is not restricted to any one GPS technology.

Geographical sampling requires discrete geographical data along the mark path. A continuous geographical path is not required. A vehicle equipped with the apparatus of the present invention will be able to travel at moderate speed with respect to the current traffic flow and will only need to sample the roadway mark along the mark path at discrete points.

The apparatus of the present invention uses the sampled positions of the roadway mark to determine a continuous mathematical function which provides a smoothly varying function representing the actual mark path. Although the Manning patents disclose that the designer of a drawing pattern can use linear interpolation between two points for a roadway mark, and then these individual line segments can be joined to make a relatively long continuous painted line, or the designer may use a pre-existing equation using known geographical location coordinates as independent variables within the drawing pattern, no mathematical computation is disclosed which determines a "best fit" continuous geographical location equation based upon the actual sampled roadway mark locations. The apparatus of the present invention calculates a "best fit" equation.

The apparatus also automatically re-paints roadway marks depending upon the previous mark type. The mark type and dimensional characteristics are used in combination with the determined vehicle speed to control the paint dispensing unit. Thus, the unit accurately and uniformly re-paints the prior existing mark onto the repaved or milled roadway surface.

The apparatus provides for automatic and semi-automatic vehicle alignment and movement on a path. A vehicle navigation system (an "auto-pilot") maintains the vehicle 1 on the roadway mark path 470. The desired mark location is mathematically determined using sampled geographical positions from the old mark. A comparison is then made between the actual mark location and the desired mark location. An error signal is determined based upon this difference which is used by the auto-pilot to correct the position of the vehicle 1.

A visual indication of the position of the vehicle 1 with respect to the roadway mark path 470 is also provided. The display 30 helps the driver of the vehicle 1 in steering and maintaining the position of the vehicle 1 on the desired roadway mark path 470. The display 30 preferably illustrates the actual mark path of the vehicle 1 as computed by the previously sampled mark path, and therefore a conventional guide wheel and guide wheel support bracket or other assistive pointer devices are not required. The visual indication of the position of the vehicle 1 with respect to the roadway mark path can also assist the driver of a snow plow to maintain the proper position on the roadway.

During the sampling process for determining the geographical location of the roadway mark path 470, the apparatus also automatically determines the type and dimensional characteristics (for example the length and width and, if appropriate, the spacing distance between marks) of the of the roadway mark. For example, the mark may be a dashed sequence or may be a solid line. If the mark is a dashed line, the apparatus is capable of determining the spacing between the dashes. Thus, the apparatus of the present invention automatically determines existing roadway mark characteristics.

The material spray dispensing rate is responsive to vehicle speed. This feature of the apparatus is important toward depositing a consistent and uniform amount of paint onto the road 2. If the dispensing rate is held constant, a different amount of paint could be deposited onto the road 2 depending upon the speed of the vehicle 1. For example, a slow moving vehicle 1 would deposit a greater amount of paint than a faster moving vehicle 1 with a constant dispensing rate.

Like other known devices, the apparatus of the present invention uses a predetermined path, map, or image for the paint dispenser or vehicle to follow. A significant difference between the apparatus and known devices, however, is how the predetermined path is obtained. The apparatus creates a digital image of the surface before painting or marking the surface. A crude image is scanned (the image is mapped) and then an enhanced version is reprinted over the original crude image. The apparatus also mathematically models the predetermined path using sampled geographical data of the original mark path. The sampled data are obtained using GPS.

The apparatus also uses any conventional paint (or other material) to place (paint or deposit or apply) the marking on the road 2. The material need not be modified. Some conventional devices modify the marker material in order to function. For example, U.S. Pat. No. 4,219,092 discloses using a radioactive paint as the marker material. The radioactive emission of the paint is then differentially detected by the vehicle and used to guide the vehicle along the predetermined path. It is an advantage of the apparatus according to the present invention, of course, that the material need not be modified.

Other conventional devices convert a drawing pattern produced from an application drawing program into a geographically defined image in suitable form for being deposited onto a surface using GPS technology. Still other conventional devices use a drawing tool to draw polygons to define geographical areas of interest for farming or other applications. The apparatus according to the present invention does not require a drawing pattern, and in fact can create the actual mark path for other purposes.

One of those other purposes is the creation of another parallel path which is derived from the original continuous mark path. The apparatus calculates a parallel path displaced from the calculated continuous mark path which was derived from the sampled original roadway mark. For example, having the calculated continuous mark path such as the center line of a roadway, a positional offset can be used to calculate another mark path which parallels the center line. This second mark path could be the roadway side mark line. An advantage of the apparatus is that only one roadway mark is required.

Potential applications for the apparatus and method of the present invention are many and varied. The primary application is, of course, re-painting of demarcation line marks on roads. Related applications include the deposition of replacement marks on highways, parking lots, air landing fields, pathways, or walkway structures designed for vehicular, foot, or other traffic. In addition to marking pavement, the apparatus and method can re-mark a playing field for a sport such as football.

The apparatus and method can also be applied to assist snow plows, specifically by providing a snow plow truck guidance system. Such a system can guide a vehicle having a snow plow along a roadway. The GPS-based locator samples discrete geographical location data of a pre-existing roadway mark. The computer determines a continuous smooth geographical location function fitted to the sampled geographical location data. An actuator responsive to the GPS-based locator and geographical location function then positions the snow plow.

Another application for the apparatus and method is re-applying or re-depositing a demarcation line mark as a coating on a surface. The coating may be hard or soft, permanent or transitory. The mark may be formed by causing a coating material to extend, impregnate, or penetrate into the surface material; the term "coating" is used in the general sense to include both surface coating and impregnation. Preparatory treatments of the surface material, subsequent treatments of the coated surface material, and other ancillary non-coating operations are also envisioned. Such operations include processes like etching to make the surface more compatible with, or adherent to, the coating. The coating can form lines, stripes, or indicative markings and can contain material particularly adapted to reflect light.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed is:

1. An apparatus for placing marks such as paint or another marking material onto the surface of a roadway, the apparatus comprising:
   a moving vehicle;
   a GPS-based machine vision locator positioned on the vehicle for automatically sampling discrete geographical location data of an actual pre-existing roadway mark evident on the roadway before the mark is removed;
   a computer including (a) a sampling program which receives a GPS reference location and uses a coordinate system having the origin defined at the reference location and further, based upon the coordinate system and a sampling interval, samples the geographical location of the pre-existing roadway mark, and (b) a curve fitting program which inputs discrete GPS coordinate data stored in data memory and determines a continuous smooth geographical location function best-fitted to the sampled geographical location data;
   a marker positioned on the vehicle, having a GPS geographical location, and being responsive to the GPS-based machine vision locator and geographical location function for replicating automatically the pre-existing roadway mark onto the surface of the roadway; and a feedback system comparing the GPS geographical location of the marker and the geographical location function and correcting the position of the marker if the comparison identifies an error.

2. The apparatus according to claim 1 wherein the GPS-based machine vision locator includes a GPS antenna, adapted to receive GPS radio wave signals originating from a GPS satellite system or a GPS-pseudolite array, connected to a GPS receiver which decodes the GPS signals for determining its geographical location.

3. The apparatus according to claim 1 further comprising a first imager focusing downwardly onto the roadway and providing an image of the roadway mark.

4. The apparatus according to claim 3 further comprising a second imager which images the roadway in front of the apparatus.

5. The apparatus according to claim 1 wherein the apparatus is adapted to be directed by an operator and the apparatus further comprises a keyboard permitting the operator to enter data.

6. The apparatus according to claim 5 further comprising a display adapted to present information to the operator.

7. The apparatus according to claim 1 wherein the marker is a nozzle array and control system which places marking material on the roadway.

8. The apparatus according to claim 7 further comprising a moveable cross track carriage, to which the nozzle array and control system is mounted, for positioning the nozzle array over the roadway mark.

9. The apparatus according to claim 8 further comprising a servo control system controllably moving the cross track carriage to a desired position.

10. The apparatus according to claim 7 further comprising a speed detector informing the nozzle array and control system and enabling the nozzle array and control system to adjust the rate at which it places the marking material.

11. The apparatus according to claim 1 further comprising navigation and control system controlling the direction, speed, and acceleration of the vehicle along a predetermined path.

12. The apparatus according to claim 1 wherein the computer stores the characteristics of the pre-existing roadway mark, including type, geometry, and dimensions.

13. The apparatus according to claim 1 wherein the computer generates an additional roadway mark function by offsetting the continuous function by an amount consistent with the desired position of a second roadway mark relative to the replicated roadway mark.

14. A moving vehicle for placing marks such as paint or another marking material onto the surface of a roadway at the direction of an operator, the vehicle comprising:

a GPS-based machine vision locator for automatically sampling discrete geographical location data of an actual pre-existing roadway mark evident on the roadway before the mark is removed, the GPS-based machine vision locator including a GPS antenna, adapted to receive GPS radio wave signals originating from a GPS satellite system or a GPS-pseudolite array, connected to a GPS receiver which decodes the GPS signals for determining its geographical location, and a first imager focused downwardly onto the roadway and providing an image of a roadway mark;

a keyboard adapted to permit the operator to enter data;

a computer including (a) a sampling program which receives a GPS reference location and uses a coordinate system having the origin defined at the reference location and further, based upon the coordinate system and a sampling interval, samples the geographical location of the pre-existing roadway mark, and (b) a curve fitting program which inputs discrete GPS coordinate data stored in data memory and determines a continuous smooth geographical location function best-fitted to the sampled geographical location data;

a display adapted to present information to the operator;

a nozzle array and control system having a GPS geographical location and being responsive to the GPS-based machine vision locator and geographical location function for replicating automatically a roadway mark on the surface of the roadway by placing a marking material on the roadway; and a feedback system comparing the GPS geographical location of the nozzle array and control system and the geographical location function and correcting the position of the nozzle array and control system if the comparison identifies an error.

15. The vehicle according to claim 14 further comprising a vehicle navigation and control system controlling the direction, speed, and acceleration of the vehicle along a predetermined path, and a second imager which images the roadway in front of the vehicle.

16. The vehicle according to claim 15 further comprising a bus in bi-directional communication with the GPS receiver, computer, display, first imager, second imager, nozzle array and control system, servo control system, speed detector, and vehicle navigation and control system.

17. The vehicle according to claim 14 wherein the computer has an operating system, program memory, and data memory.

18. The vehicle according to claim 17 wherein the program memory has:

a location comparator program which compares the current GPS location received by the antenna and decoded by the GPS receiver to previous GPS locations stored in the data memory, then determines the difference between the current and the stored GPS locations;

the sampling program;

a machine vision program which inputs data from the first imager and performs generic machine vision operations on the image data from the first imager;

the curve fitting program; and a curve offsetting program which inputs the continuous function determined by the curve fitting program and generates a second continuous function similar and parallel to the first function but offset from the first function by a given distance.

19. A method for placing marks such as paint or another marking material onto the surface of a roadway, the method comprising the steps of:

automatically sampling the geographical location of an actual pre-existing roadway mark, evident on the roadway before the mark is removed, using a GPS-based machine vision locator positioned on a moving vehicle;

receiving a GPS reference location and using a coordinate system having the origin defined at the reference location and further, based upon the coordinate system and a sampling interval, sampling the geographical location of the pre-existing roadway mark;

inputting discrete GPS coordinate data stored in data memory and determining a continuous smooth geographical location function best-fitted to the sampled location data;

marking a roadway mark onto the surface of the roadway, at a location determined by the GPS-based machine vision locator and the geographical location function, using a marker having a GPS geographical location; and comparing the GPS geographical location of the marker and the geographical location function and correcting the position of the marker if the comparison identifies an error.

20. An apparatus for guiding a snow plow along a roadway, the apparatus comprising:

a moving vehicle adapted to have a snow plow;

a GPS-based machine vision locator positioned on the vehicle for automatically sampling discrete geographical location data of an actual pre-existing roadway mark evident on the roadway before the mark is covered by snow;

a computer including (a) a sampling program which receives a GPS reference location and uses a coordinate system having the origin defined at the reference location and further, based upon the coordinate system and a sampling interval, samples the geographical location of the pre-existing roadway mark, and (b) a curve fitting program which inputs discrete GPS coordinate data stored in data memory and determines a continuous smooth geographical location function best-fitted to the sampled geographical location data;

a positioning system having a GPS geographical location and being responsive to the GPS-based machine vision locator and geographical location function for positioning the snow plow on the surface of the roadway; and a feedback system comparing the geographical graphical location of the positioning system and the geographical location function and correcting the position of the positioning system if the comparison identifies an error.

\* \* \* \* \*

UNITED STATES PATENT AND TRADEMARK OFFICE
CERTIFICATE OF CORRECTION

| | | |
|---|---|---|
| PATENT NO. | : 8,467,968 B1 | Page 1 of 1 |
| APPLICATION NO. | : 13/351829 | |
| DATED | : June 18, 2013 | |
| INVENTOR(S) | : Dolinar et al. | |

It is certified that error appears in the above-identified patent and that said Letters Patent is hereby corrected as shown below:

In the Claims:

Claim 20, Column 20, Line 15 should read -- a feedback system comparing the GPS geographical

Signed and Sealed this
Seventeenth Day of September, 2013

Teresa Stanek Rea
*Deputy Director of the United States Patent and Trademark Office*